United States Patent
Wetterwald et al.

(10) Patent No.: US 10,348,481 B1
(45) Date of Patent: Jul. 9, 2019

(54) CLOCK HARMONIZATION IN DETERMINISTIC NETWORKS

(71) Applicant: Cisco Technology, Inc., San Jose, CA (US)

(72) Inventors: Patrick Wetterwald, Mouans Sartoux (FR); Pascal Thubert, La Colle sur Loup (FR); Eric Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/966,131

(22) Filed: Apr. 30, 2018

(51) Int. Cl.
*H04L 7/00* (2006.01)

(52) U.S. Cl.
CPC .......... *H04L 7/0087* (2013.01); *H04L 7/0037* (2013.01)

(58) Field of Classification Search
CPC .............................. H04L 7/0087; H04L 7/0037
USPC ......................................................... 375/359
See application file for complete search history.

(56) References Cited

U.S. PATENT DOCUMENTS

| | | | | |
|---|---|---|---|---|
| 6,141,355 A | * | 10/2000 | Palmer ................ | H04L 12/6402 370/235 |
| 2005/0089127 A1 | * | 4/2005 | Nagaraja ............ | H04L 27/2662 375/354 |
| 2006/0245454 A1 | | 11/2006 | Balasubramanian et al. | |
| 2009/0201169 A1 | * | 8/2009 | d'Hont .................. | G01S 13/003 340/8.1 |
| 2011/0128976 A1 | * | 6/2011 | Barry .................... | H04J 3/0661 370/478 |
| 2011/0249688 A1 | * | 10/2011 | Liu ...................... | H04W 56/002 370/503 |
| 2015/0030088 A1 | * | 1/2015 | Chan ..................... | H04N 19/42 375/240.28 |
| 2016/0021017 A1 | | 1/2016 | Thubert et al. | |
| 2017/0353292 A1 | | 12/2017 | Thubert et al. | |

FOREIGN PATENT DOCUMENTS

WO   WO-2017064565 A1   4/2017

OTHER PUBLICATIONS

Arao, et al., "Estimation of relative offset and drift between local clocks in wireless sensor networks", 2017 Sixth International Conference on Future Generation Communication Technologies (FGCT), pp. 1-5, 2017, IEEE.

(Continued)

*Primary Examiner* — Michael R Neff
(74) *Attorney, Agent, or Firm* — Behmke Innovation Group LLC; James Behmke; Stephen D. LeBarron

(57) ABSTRACT

In one embodiment, a device in a network receives a plurality of packets from one or more neighbors of the device. Each of the packets has a scheduled delivery time interval according to a deterministic communication schedule. The device determines an amount of clock drift for each of the one or more neighbors of the device by comparing arrival times of the received packets to their scheduled delivery time intervals according to the deterministic communication schedule. The device calculates a clock adjustment based on the amount of clock drift for each of the one or more neighbors. The device adjusts a clock of the device using the calculated clock adjustment.

20 Claims, 11 Drawing Sheets

(56) References Cited

OTHER PUBLICATIONS

Beke, Tibor., "Time synchronization in IoT lighting control" Master Thesis; Eindhoven University of Technology, Dec. 20, 2016; pp. 1-70.

He, et al., "Deterministic bound for avionics switched networks according to networking features using network calculus", Chinese Journal of Aeronautics, (2017), 30(6): pp. 1941-1957, Chinese Society of Aeronautics and Astronautics.

Lee, et al., "Globally Synchronized Time via Datacenter Networks", SIGCOMM '16 Aug. 22-26, 2016, Florianopolis, Brazil, 14 pages, 2016, ACM.

Lin, et al., "A Group Neighborhood Average Clock Synchronization Protocol for Wireless Sensor Networks", Sensors 2014, 14, pp. 14744-14764; doi:10.3390/s140814744, 2014, MPDI.

Maróti, et al., "The Flooding Time Synchronization Protocol", SenSys'04, Nov. 3-5, 2004, Baltimore, Maryland, USA., 11 pages, 2014, ACM.

Nagarathna, et al., "OTSA: Optimized Time Synchronization Approach for Delay-based Energy Efficient Routing in WSN", (IJACSA) International Journal of Advanced Computer Science and Applications, vol. 8, No. 4, 2017, 11 pages, 2017, www.ijacsa.thesai.org.

Viswanathan, et al., "Exploiting Power Grid for Accurate and Secure Clock Synchronization in Industrial IoT", 2016 IEEE Real-Time Systems Symposium (RTSS), pp. 1-11, 2016, IEEE.

Zapke, et al. TSN: Converged Network for Industrial IoT; Farnell element 14; http://uk.farnell.com/tsn-converged-network-for-industrial-iot; pp. 1-5, Nov. 1, 2017, Premier Farnell Limited.

"Avnu Alliance", http://avnu.org/, 3 pages, Accessed Dec. 7, 2017, Avnu.

"Deterministic Networking (detnet)", https://datatracker.ietf.org/wg/detnet/about/, Accessed on Jan. 31, 2018, 3 pages, IETF.

"GPS disciplined oscillator", https://en.wikipedia.org/wiki/GPS_disciplined_oscillator, Dec. 19, 2017, 1 page, Wikimedia Foundation, Inc.

"Industrial Internet Consortium", http://www.iiconsortium.org, 3 pages, Accessed Dec. 7, 2017, Object Management Group, Inc.

"Miniature Disciplined Oscillator Modules", https://www.vectron.com/products/modules/disciplined_oscillator_modules.htm, Accessed on Jan. 18, 2018, 1 page, Microsemi.

"Network Security Analytics", https://www.extrahop.com/solutions/initiative/security/, 6 pages, Accessed on Jan. 18, 2018, ExtraHop Networks.

"Time-Sensitive Networking Market by Component (Switches, Hubs, Routers, and Gateways, and Memory), Application (Industrial Automation, Power and Energy, Automotive, Transportation, Oil & Gas, Aerospace), and Geography—Global Forecast to 2024", https://www.marketsandmarkets.com/Market-Reports/time-sensitive-networking-market-215000493.html, 2 pages, Accessed on Dec. 7, 2017, MarketsandMarkets Research Private Ltd.

"Time-Sensitive Networking Task Group", http://www.ieee802.org/1/pages/tsn.html, Accessed on Jan. 31, 2018, 2 pages, Institute of Electrical and Electronics Engineers, Inc.

"Unified Architecture", https://opcfoundation.org/about/opc-technologies/opc-ua/, Accessed on Jan. 31, 2018, 2 pages, OPC Foundation.

P. Thubert "An Architecture for IPv6 over the TSCH mode of IEEE 802.15.4 draft-ietf-6tisch-architecture-14" 6TiSCH Internet-Draft; Apr. 25, 2018; pp. 1-57.

Sajassi et al. "BGP MPLS Based Ethernet VPN draft-ietf-l2vpn-evpn-11" Network Working Group Internet-Draft Oct. 18, 2014; pp. 1-52.

* cited by examiner

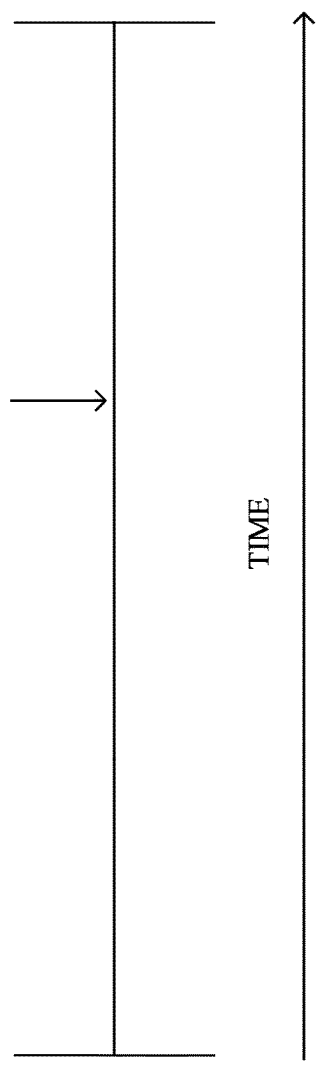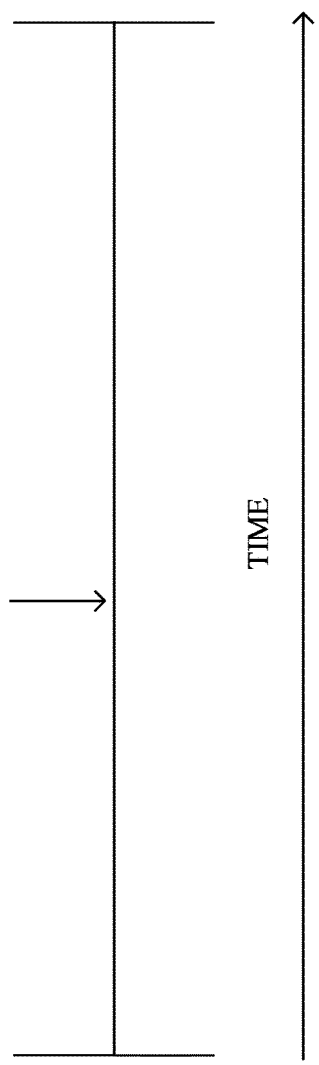

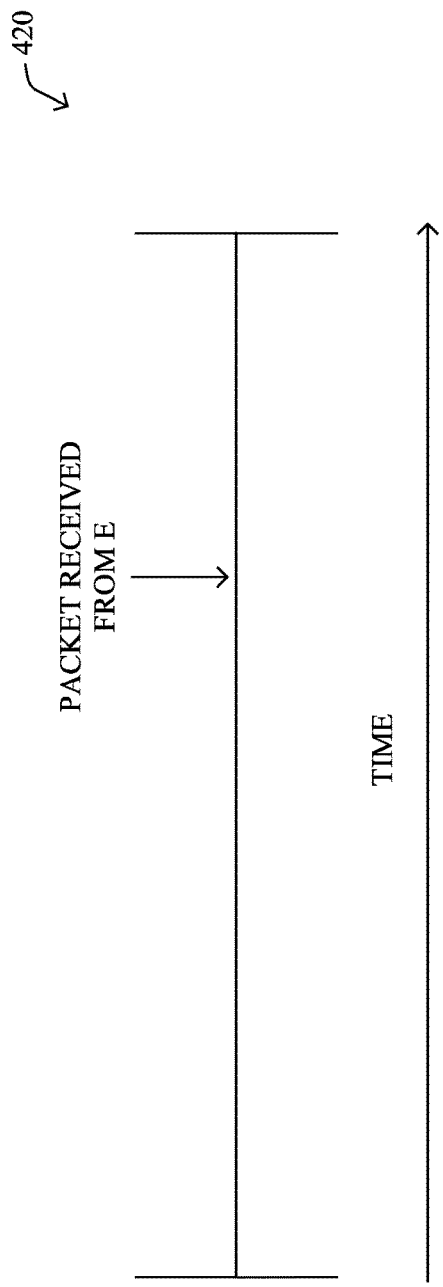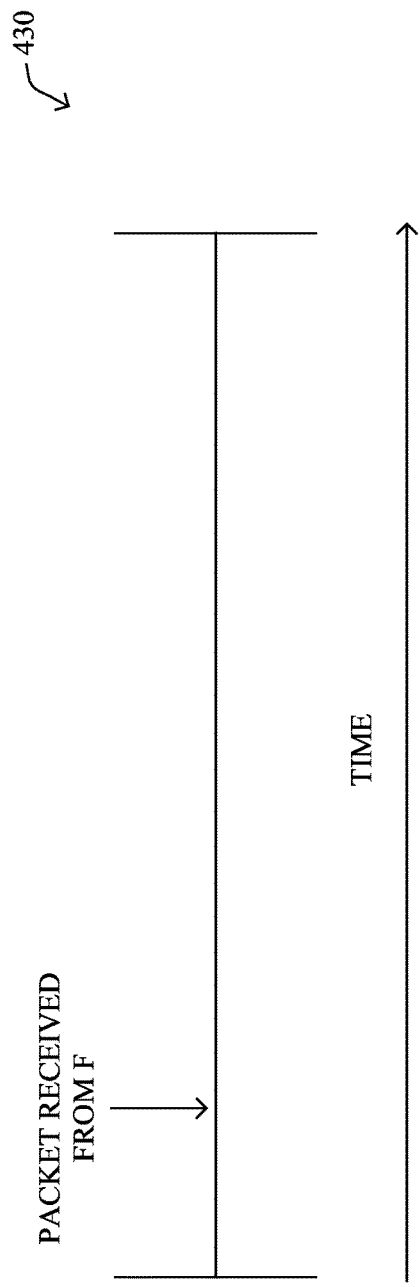
FIG. 4C
FIG. 4D

CLOCK HARMONIZATION IN DETERMINISTIC NETWORKS

TECHNICAL FIELD

The present disclosure relates generally to computer networks, and, more particularly, to clock harmonization in deterministic networks.

BACKGROUND

In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4D illustrate examples of neighbor clock drift in a deterministic network;

DESCRIPTION OF EXAMPLE EMBODIMENTS

Overview

Figure 1:
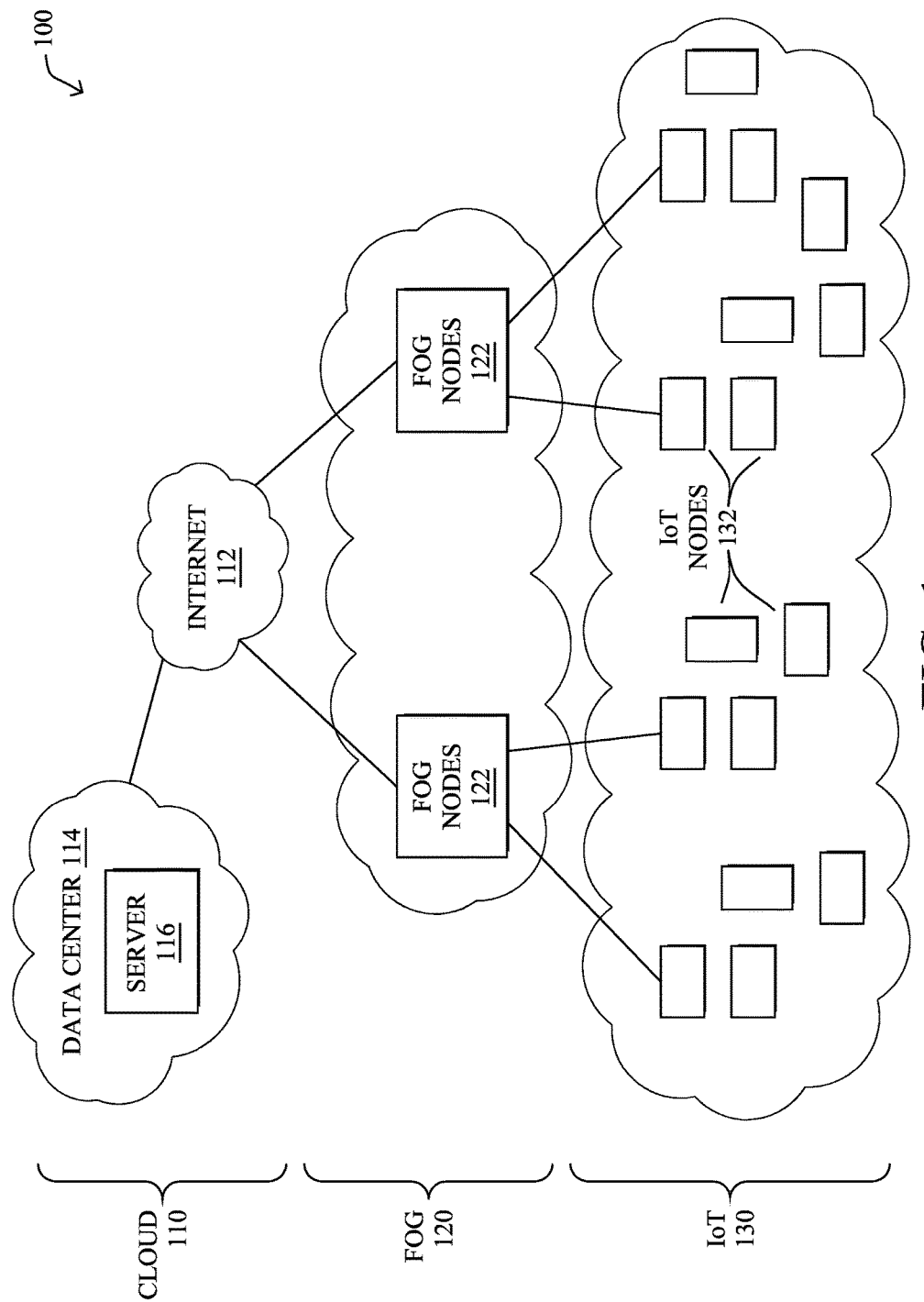
FIG. 1 illustrates an example computer network.

According to one or more embodiments of the disclosure, a device in a network receives a plurality of packets from one or more neighbors of the device. Each of the packets has a scheduled delivery time interval according to a deterministic communication schedule. The device determines an amount of clock drift for each of the one or more neighbors of the device by comparing arrival times of the received packets to their scheduled delivery time intervals according to the deterministic communication schedule. The device calculates a clock adjustment based on the amount of clock drift for each of the one or more neighbors. The device adjusts a clock of the device using the calculated clock adjustment.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

Figure 2:
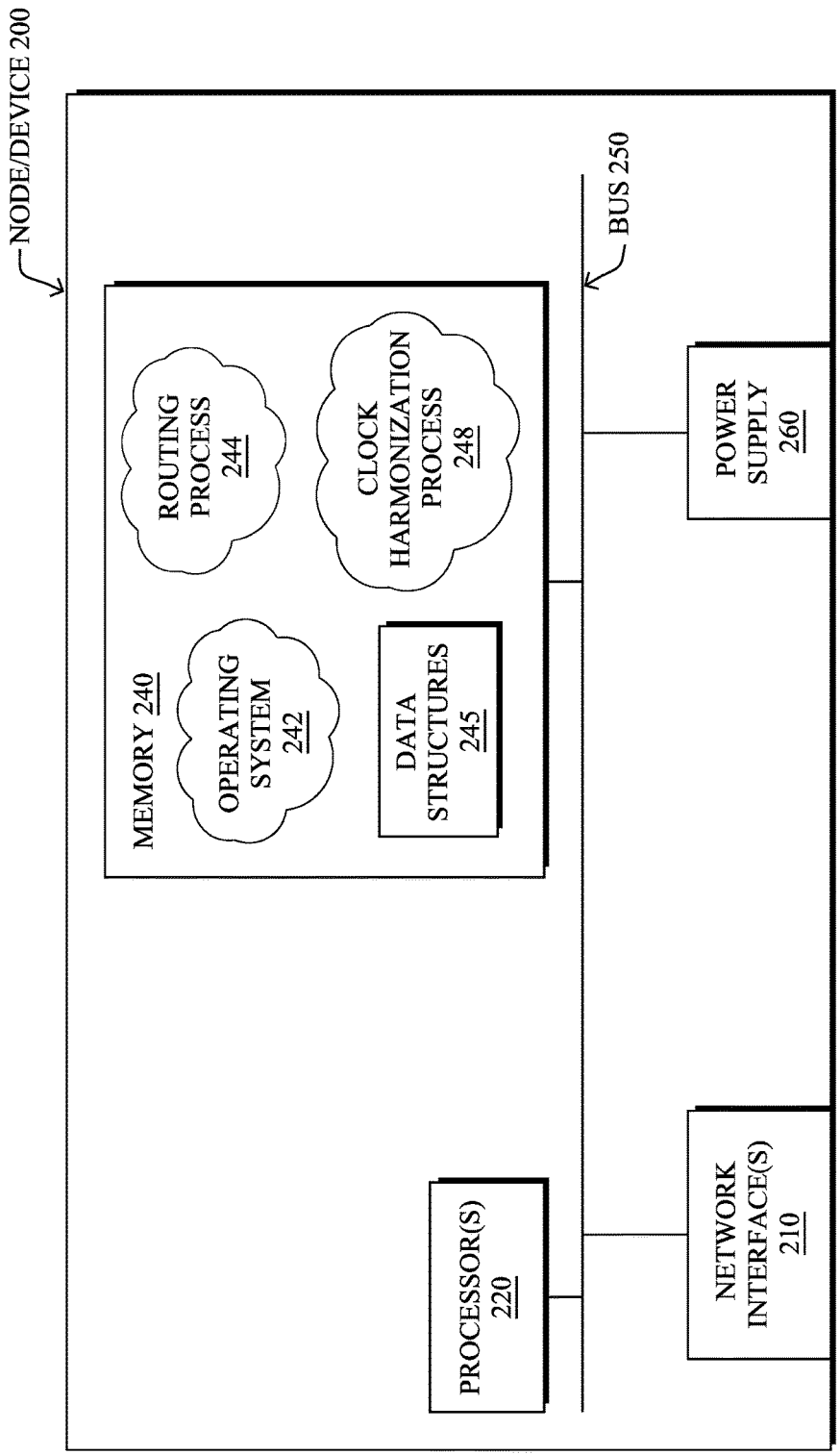
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise a routing process 244 and/or a clock harmonization process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-12vpn-evpn>, introduce a solution for multipoint L2VPN services, with advanced multi-homing capabilities, using BGP for distributing customer/client media access control (MAC) address reach-ability information over the core MPLS/IP network.

Another example protocol that routing process 244 may implement, particularly in the case of LLN mesh networks, is the Routing Protocol for Low Power and Lossy (RPL), which provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

According to various embodiments, node/device 200 may communicate deterministically within a network. Notably, many low power wireless industrial process control typically uses 1 Hz to 4 Hz control loops, and for those, a scheduled MAC protocol can be considered deterministic, even when clocks drift in the order of tens of parts per million (ppm). A low-throughput technology such as IEEE 802.15.4 may thus be adapted to support determinism. In particular, the bandwidth can be pre-formatted in a time division multiplexing (TDM) fashion using IEEE 802.15.4, and time slots become a unit of throughput that can allocated to a deterministic flow, without incurring a huge consumption of system resources. In other implementations of a time sensitive network, individual timers may be used by the networked devices instead of TDM. Such timers may elapse at the time of a deterministic transmission, so as to reserve the medium for that transmission, leaving the medium free for best effort routing the rest of the time.

Routing in a deterministic network can be operated either in a centralized or in a distributed fashion, but only the centralized routing operation can guarantee the overall optimization for all the flows with a given set of constraints and goals. An example architecture to support such a technique may be found in the IETF draft entitled "An Architecture for IPv6 over the TSCH mode of IEEE 802.15.4e" by Thubert et al. (February 2014), and referred to herein as "6TiSCH." The centralized computation is typically done by a path computation engine (PCE) with an objective function that represents the goals and constraints. A PCE may compute not only an optimized Layer 3 path for purposes of traffic engineering, but also to compute time slots associated with a deterministic flow at the same time as it computes a route over an LLN. Generally speaking, this requires the PCE to have knowledge of the flows as well as knowledge of the radio behavior at each hop (e.g., an estimation of the expected transmission count (ETX) so as to provision enough time slots for retransmissions).

For distributed routing, 6TiSCH relies on the RPL routing protocol. The design of RPL also includes the capability to build routing topologies (e.g., "instances" in RPL parlance) that are associated with objective functions, but in a distributed fashion. With RPL, the routing operations will be more efficient (e.g., with no need of CPU intensive PCE computations) and resilient (e.g., with no dependence on a PCE for base routing and recovery). Of note is that scheduling is not a part of RPL and may be designed for the distributed routing scheme. Although it is not possible to guarantee that an individual path is fully optimized, or that the distribution of resources is globally optimized, it may be possible to impose deterministic behavior along a routing path (e.g., an ultra-low jitter, controlled latency, etc.).

Example standards for deterministic networking/TSN include, but are not limited to, Institute of Electrical and Electronics Engineers (IEEE) 802.1Qca, 802.1Qbv, 802.1Qbu/802.3br, 802.1Qch, 802.1AS-Rev, 1588 v2, 802.1Qcc, 802.1Qci, 802.1CB, and 802.1CM Likewise, the Internet Engineering Task Force (IETF) has established a deterministic network (DetNet) working group to define a common deterministic architecture for Layer 2 and Layer 3. Further standards for deterministic networking also include OPC Unified Architecture (UA) from the OPC Foundation, as well as the International Electrotechnical Commission (IEC) 61850-90-13 and MT-9 standards. As would be appreciated, the deterministic networking standards listed above are exemplary only and the techniques herein can be used with any number of different deterministic networking protocols.

As noted above, deterministic networking represents recent efforts to extend networking technologies to industrial settings. Indeed, industrial networking requires having predictable communications between devices. For example, consider a control loop in which a controller controls an actuator, based on a reading from a sensor. In such a case, a key requirement of the network may be the guarantee of packets being delivered within a bounded time. This translates into the following characteristics needed by a typical deterministic network:

High delivery ratio (e.g., a loss rate of $10^{-5}$ to $10^{-9}$, depending on the application)
Fixed latency
Jitter close to zero (e.g., on the order of microseconds)

A limited degree of control can be achieved with QoS tagging and shaping/admission control. For time sensitive flows, though, latency and jitter can only be fully controlled with the effective scheduling of every transmission at every hop. In turn, the delivery ratio can be optimized by applying 1+1 packet redundancy, such as by using High-availability Seamless Redundancy (HSR), Parallel Redundancy Protocol (PRP), or the like, with all possible forms of diversity, in space, time, frequency, code (e.g., in CDMA), hardware (links and routers), and software (implementations).

Deterministic Ethernet and deterministic wireless generally utilize a communication scheduling mechanism (e.g., as computed by a supervisory device, such as a PCE) that requires the internal clocks of the nodes/devices along a network path to be synchronized. To do so, a time synchronization protocol, such as the Network Time Protocol (NTP) or Precision Time Protocol (PTP) can be used to effect clock synchronization among the network devices. The degree of clock precision among the devices often needs to be within microseconds or less.

The forwarding of each packet is then regulated by a deterministic communication schedule that specifies when the packet has to be transmitted to the wire or radio. This is done for each node/device along the network path. The specific time period is called a time slot. A supervisory device, sometimes referred to as the "orchestrator," usually performs the computation of this path and the associated timetable. Such an approach is akin to a PCE in MPLS networks, in order to compute Traffic Engineering Label Switched Paths, with the major difference being that a time schedule is computed instead of simply a constrained shortest path (e.g., the path in a deterministic network having both spatial and temporal aspects).

When the supervisory device completes computation of the deterministic communication schedule, it may then download the path and the timetable to each of the devices participating in the forwarding. In turn, these nodes will then begin receiving and sending packets according to the computed schedule. When more packets arrive in a given time interval than scheduled, a deterministic node/device will protect itself and declassify or drop packets. Accordingly, one potential timing issue that may occur in a deterministic network is the loss of timeliness (e.g., a packet not arriving at its destination within its scheduled time interval, as opposed to classical congestion loss).

Deterministic networking is a fundamental component of the IoT and can be used in a number of different use cases, ranging from industrial automation to inflight control systems to internal vehicle networking. Most of these application fields are mission critical and require very strict control in terms of timing.

Without clock synchronization, a deterministic network cannot work at all. There are various cases that can cause clock synchronization to fail in a network. These causes can include, but are not limited to, loss of a master clock, attack on the synchronization protocol (e.g., a delay attack, etc.), and other issues that can cause the clocks of the network devices to drift. To mitigate the effects of such issues, some deployments are now utilizing very complex clock systems with redundant clocks. However, this approach may not be feasible in many implementations.

Clock Harmonization in Deterministic Networks

The techniques herein introduce a methodology for harmonizing the clocks of network devices that participate in deterministic communications. In some aspects, the techniques herein leverage the arrival times of data packets of deterministic flows within their scheduled reception intervals, to determine the clock drifts of neighboring devices. Said differently, the techniques herein make use of the fact that all transmission and arrival times in a deterministic network are pre-computed by a supervisory device beforehand, allowing a given device to infer the clock drift of its neighbors.

Specifically, according to one or more embodiments of the disclosure as described in detail below, a device in a network receives a plurality of packets from one or more neighbors of the device. Each of the packets has a scheduled delivery time interval according to a deterministic communication schedule. The device determines an amount of clock drift for each of the one or more neighbors of the device by comparing arrival times of the received packets to their scheduled delivery time intervals according to the deterministic communication schedule. The device calculates a clock adjustment based on the amount of clock drift for each of the one or more neighbors. The device adjusts a clock of the device using the calculated clock adjustment.

Illustratively, the techniques described herein may be performed by hardware, software, and/or firmware, such as in accordance with the clock harmonization process 248, which may include computer executable instructions executed by the processor 220 (or independent processor of interfaces 210) to perform functions relating to the techniques described herein, e.g., in conjunction with routing process 244.

Figure 3A:
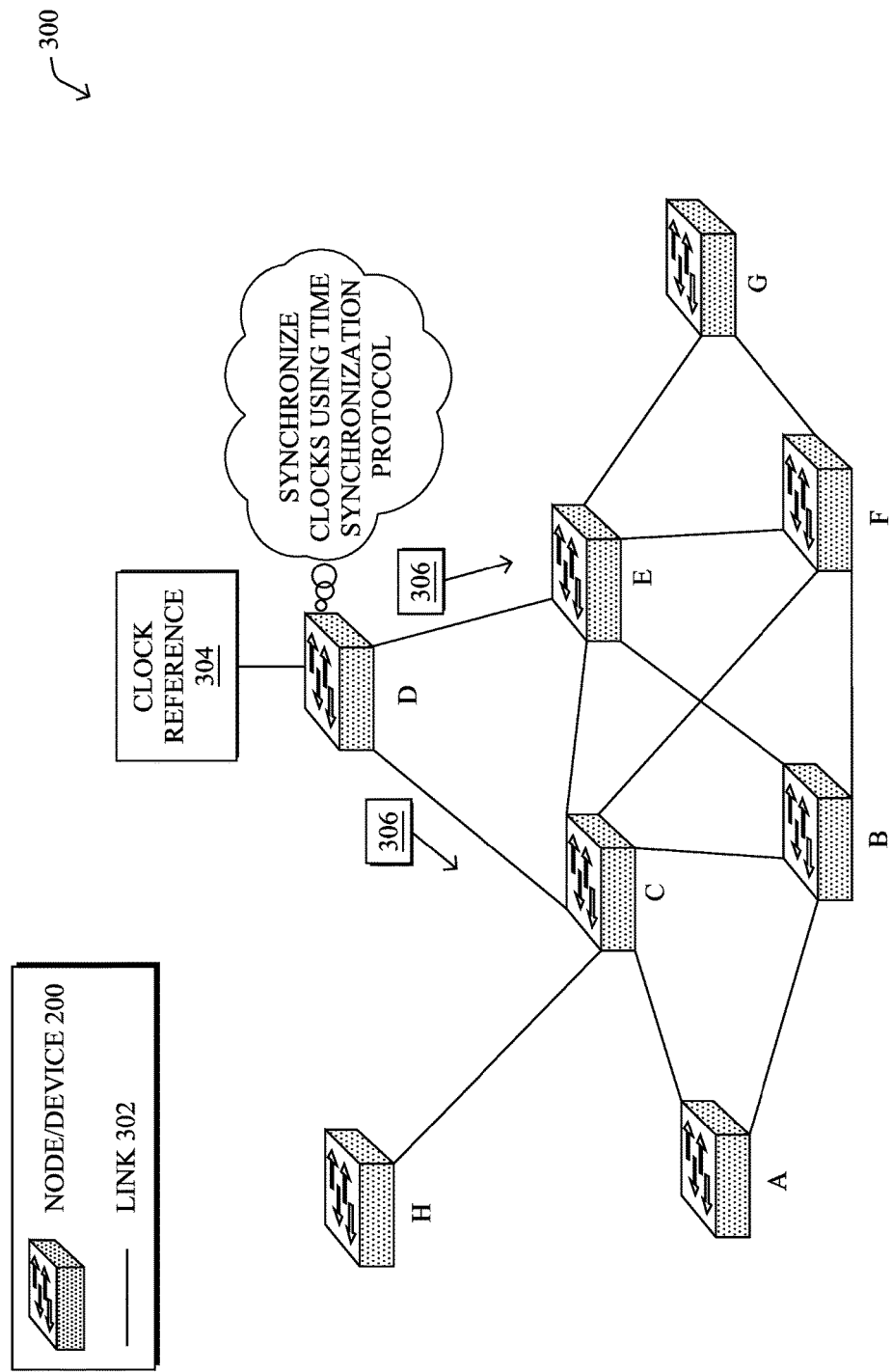
FIGS. 3A-3C illustrate examples of clock harmonization in a deterministic network.
Figure 3B:
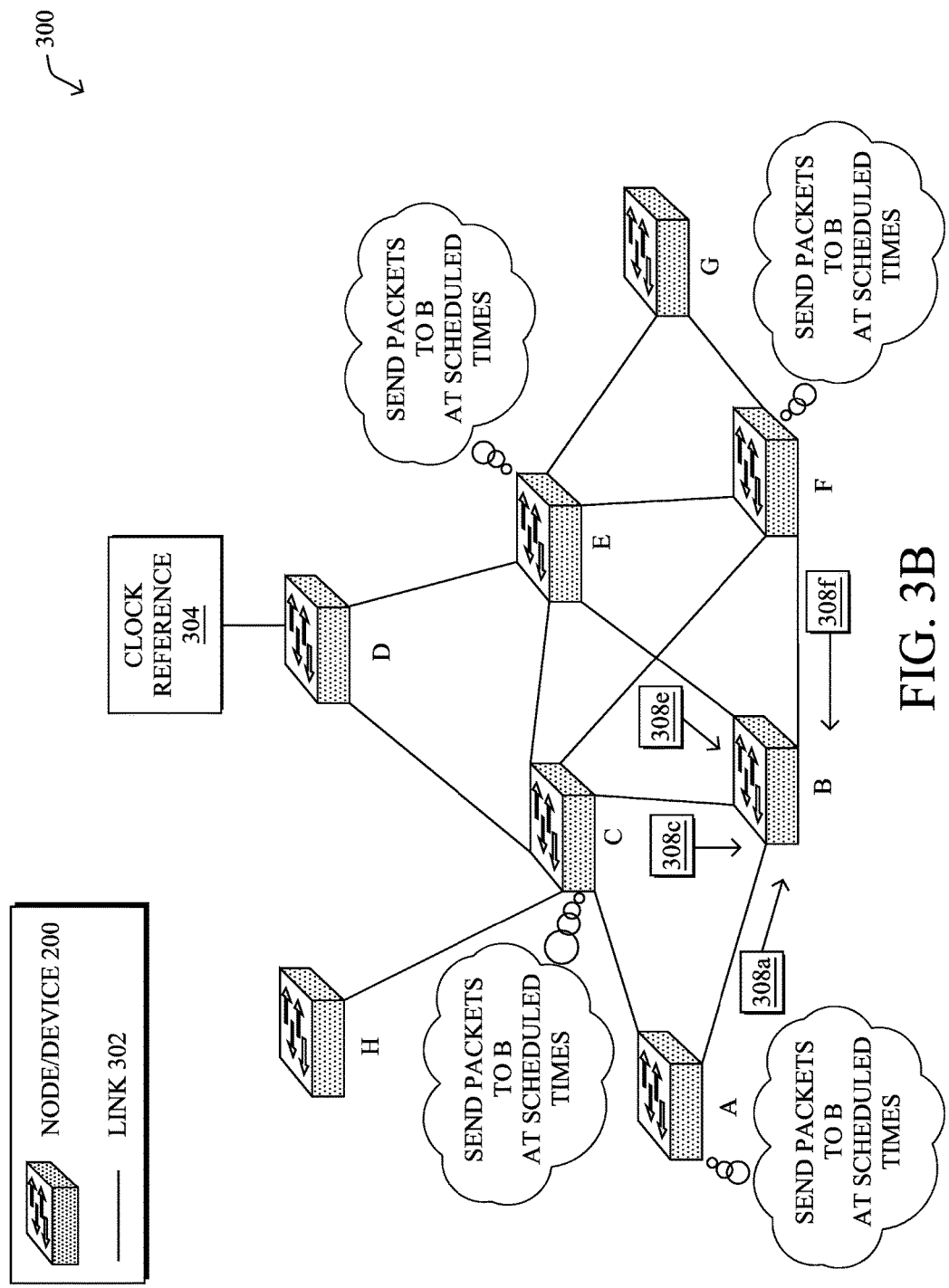
Figure 3C:
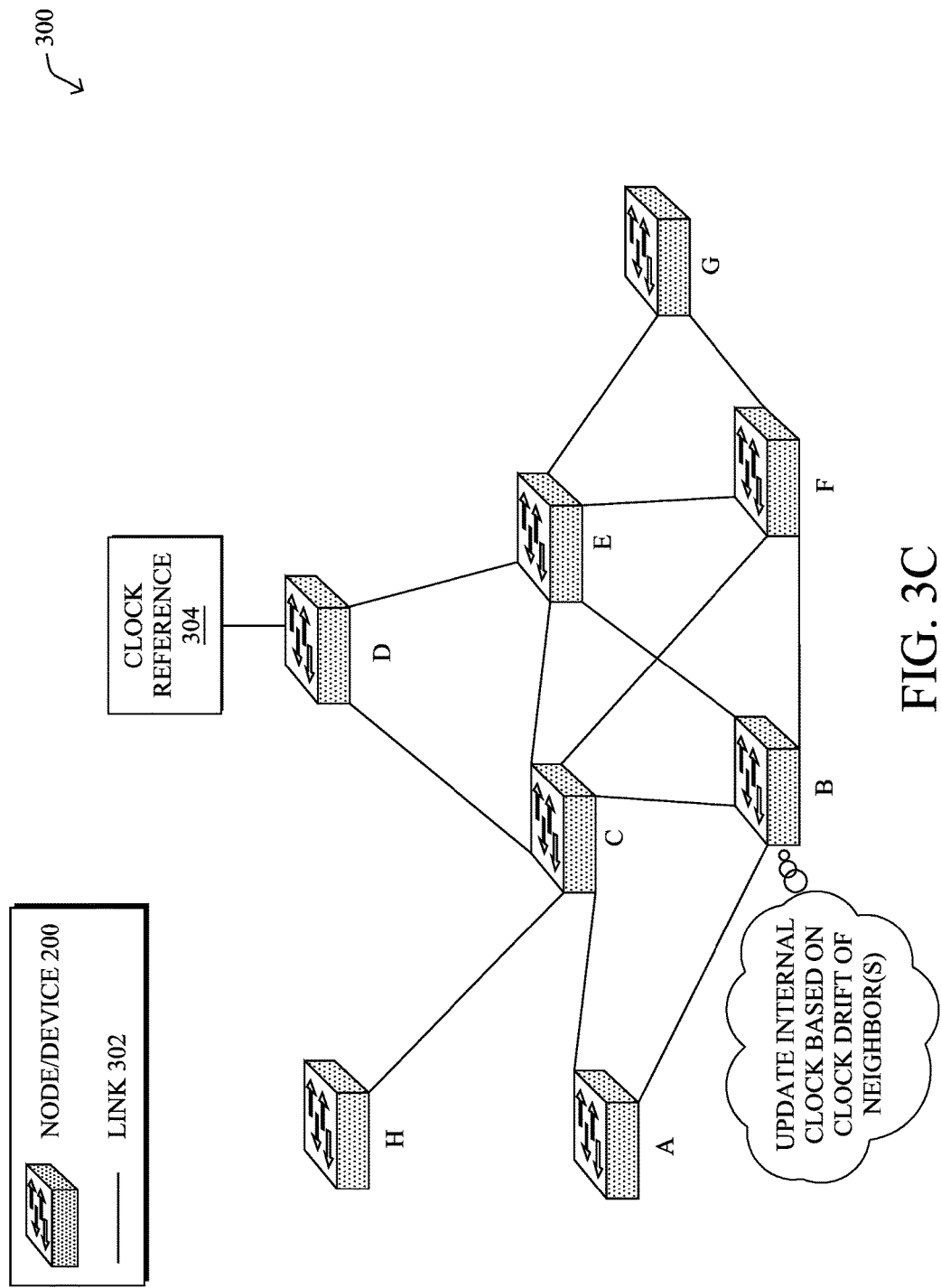

Operationally, FIGS. 3A-3C illustrate examples of clock harmonization in a deterministic network using the techniques herein, according to various embodiments. As shown in FIG. 3A, assume that there is a deterministic network 300 that comprises any number of nodes/devices 200 that are interconnected by links 302. For illustrative purposes, set of nodes/devices 200 labeled 'A' through 'H' are shown. Such devices may comprise any number of networking devices, such as switches, routers, or the like. As would be appreciated, links 302 may be hardwired links (e.g., Ethernet, etc.) or, alternatively, wireless links among the devices 200.

To synchronize the internal clocks of devices A-H, network 300 may include a clock reference 304 that may be external or internal to device D shown. Sometimes also referred to as a "master clock," clock reference 304 maintains a clock to which each of devices A-H may set their own clocks. To effect this clock synchronization, clock synchronization protocol messages 306 may be promulgated throughout network 300. For example, NTP and PTP messaging are suitable synchronization protocol messages that can be used to synchronize the clocks of devices A-H. In other embodiments, the initial clock synchronization between devices A-H may be performed simply by having a device send a packet with a timestamp that can be assessed by the receiver. In order to avoid loops, a distance vector protocol can be used for time diffusion.

In various embodiments, assume that a supervisory device/orchestrator has computed network paths between devices A-H as generated a corresponding deterministic communication schedule to implement these paths. When installed to devices A-H, the deterministic communication schedule specifies to a given device 200 the time interval(s) at which the device is expected to send packets to the neighbor(s) of the device, as well as the time intervals at which the device expects to receive packets from its neighbor(s). So long as each of the devices along a given network path are sent and received within their scheduled time interval, delivery of a packet can be guaranteed within a bounded timeframe. Usually at the edge of a deterministic network the UNI interface offers a buffering system and then ensure that packet flows which enter the deterministic network conform to the specification (e.g., using od shapers). This means that exact clock synchronization should happen within the network only for effective deterministic transmission.

Of course, ensuring packet delivery within its bounded delivery time interval requires that the clocks of each of the devices A-H remain synchronized to a very precise degree. If not, the differences between the clocks of two or more of the devices along a path could cause the packet to arrive at its destination outside of its scheduled delivery time interval.

As shown in FIG. 3B, a receiving device may receive packets from one or more of its neighbors, according to the deterministic communication schedule. For example, as shown, consider device B, which may receive packets from any or all of its neighbors, devices A, C, E, and/or F, in their scheduled time intervals. More specifically, neighbor device A may send packets 308a at a defined time interval in the communication schedule for reception by device B within a certain reception interval. Similarly, neighbor device C may send packets 308c to device B according to its scheduled intervals, neighbor device E may send packets 308e to device B according to its scheduled intervals, and neighbor device F may send packets 308f to device B according to its scheduled intervals.

In various embodiments, as shown in FIG. 3C, device B may adjust its own internal clock based on the time drift of its neighbor(s). To compute these time drifts, device B may compare the arrival times of the received packets 308 to their scheduled delivery time intervals according to the deterministic communication schedule. For example, FIGS. 4A-4D illustrate examples of neighbor clock drift that can be inferred by the receiving device B. More specifically, the neighboring devices A, C, E, and F of receiving device B may each have a corresponding delivery time interval 400-430 in the deterministic communication schedule, respectively. During these time intervals 400-430, device B can expect to receive a packet from its associated neighbor.

In a perfect world, all the packets should arrive at the midpoints of the corresponding delivery intervals 400-430. However, the individual clocks of the devices can drift over time due to factors such as temperature, voltage, and the like. As a result, the packet arrival times may also drift away from the midpoints of their delivery intervals, as well. For example, in FIG. 4A, the time drift for device A may result in its packet being received by device B slightly after the midpoint of its scheduled delivery interval 400. However, in FIG. 4B, the time drift for device C may result in its packet being received by device B slightly before the midpoint of its scheduled delivery interval 410. FIGS. 4C-4D illustrate even more extreme cases of clock drift with respect to the midpoints of the delivery intervals 420-430 of devices E and F, respectively. In even more extreme cases, the Referring again to FIG. 3C, device B can compute the clock drifts of its neighbors in any number of ways. In a simple embodiment, device B may simply calculate the time difference between the arrival time of a given packet and the midpoint of its scheduled delivery time interval. In more complex embodiments, device B may perform statistical analysis on these differences for a plurality of packets, to compute the clock drift. For example, device B may assess the mean, median, mode, or the like, of the differences between the packet arrival times and the midpoint of their scheduled delivery intervals, to quantify the amount of clock drift of one of its neighbors.

In various embodiments, device B may use the computed clock drifts for its neighboring devices, to adjust its own internal clock. For example, in one embodiment, device B may adjust its clock using an average of the clock drifts of its neighbors. In further embodiments, device B may adjust its clock using any other aggregated metric for the clock drifts of its neighbors (e.g., the median, mode, weighted average, etc.). Note that this clock adjustment may be performed in addition to the clock synchronization from the synchronization protocol in use, such as NTP or PTP. For example, device B may perform the clock harmonization techniques herein in between NTP or PTP synchronization messages initiated by clock reference 304.

By having each of devices A-G adjust its own internal clock according to the determined clock drift of its neighbor(s) vis-à-vis the deterministic communication schedule for network 300, this allows the set of devices A-G to drift together. Thus, even if devices A-G drift away from clock reference 304, they do so together, thereby still satisfying the deterministic communication schedule.

Figure 5A:
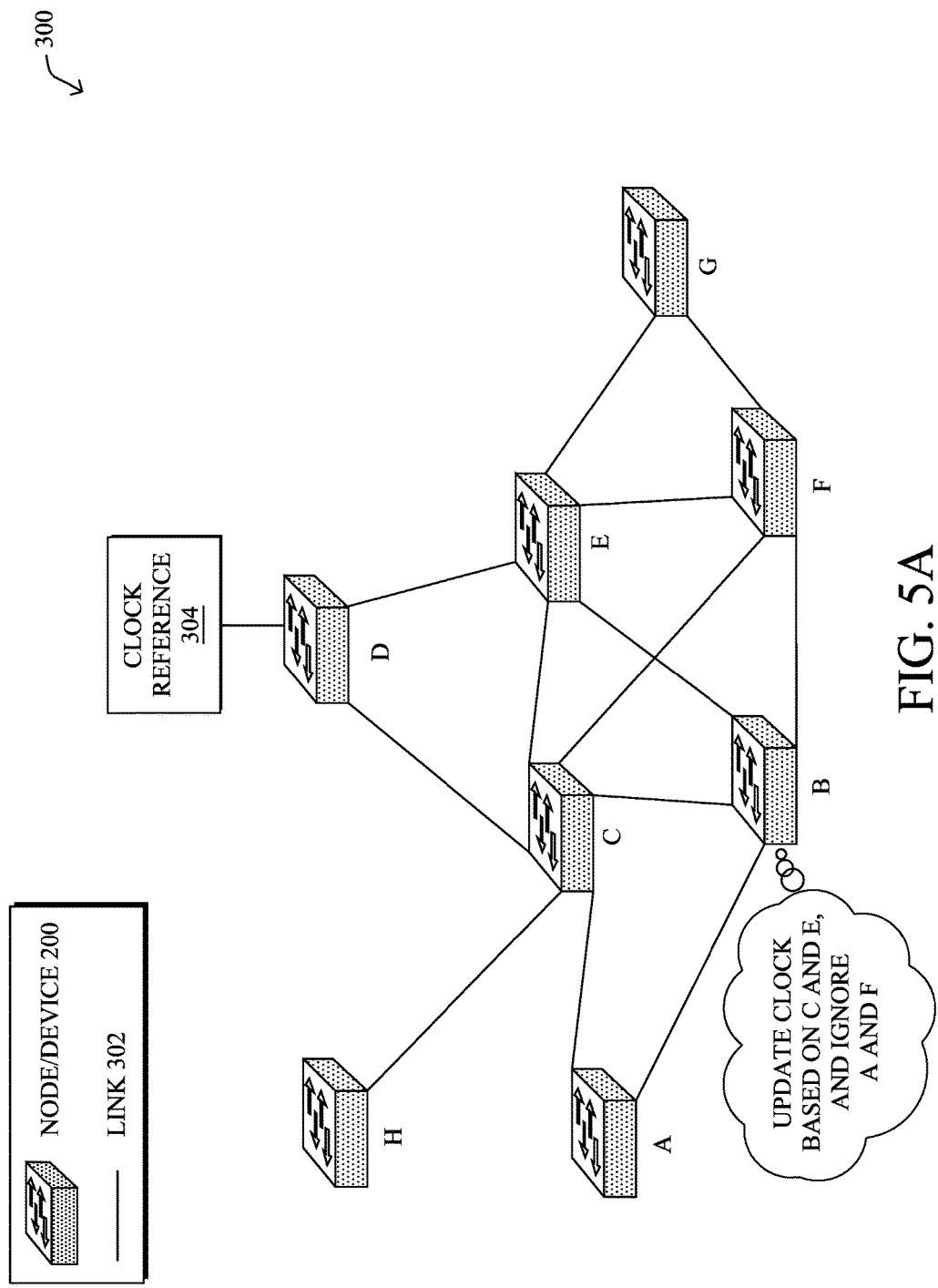
FIGS. 5A-5C illustrate examples of a device in a deterministic network assessing neighbor clock drift.
Figure 5B:
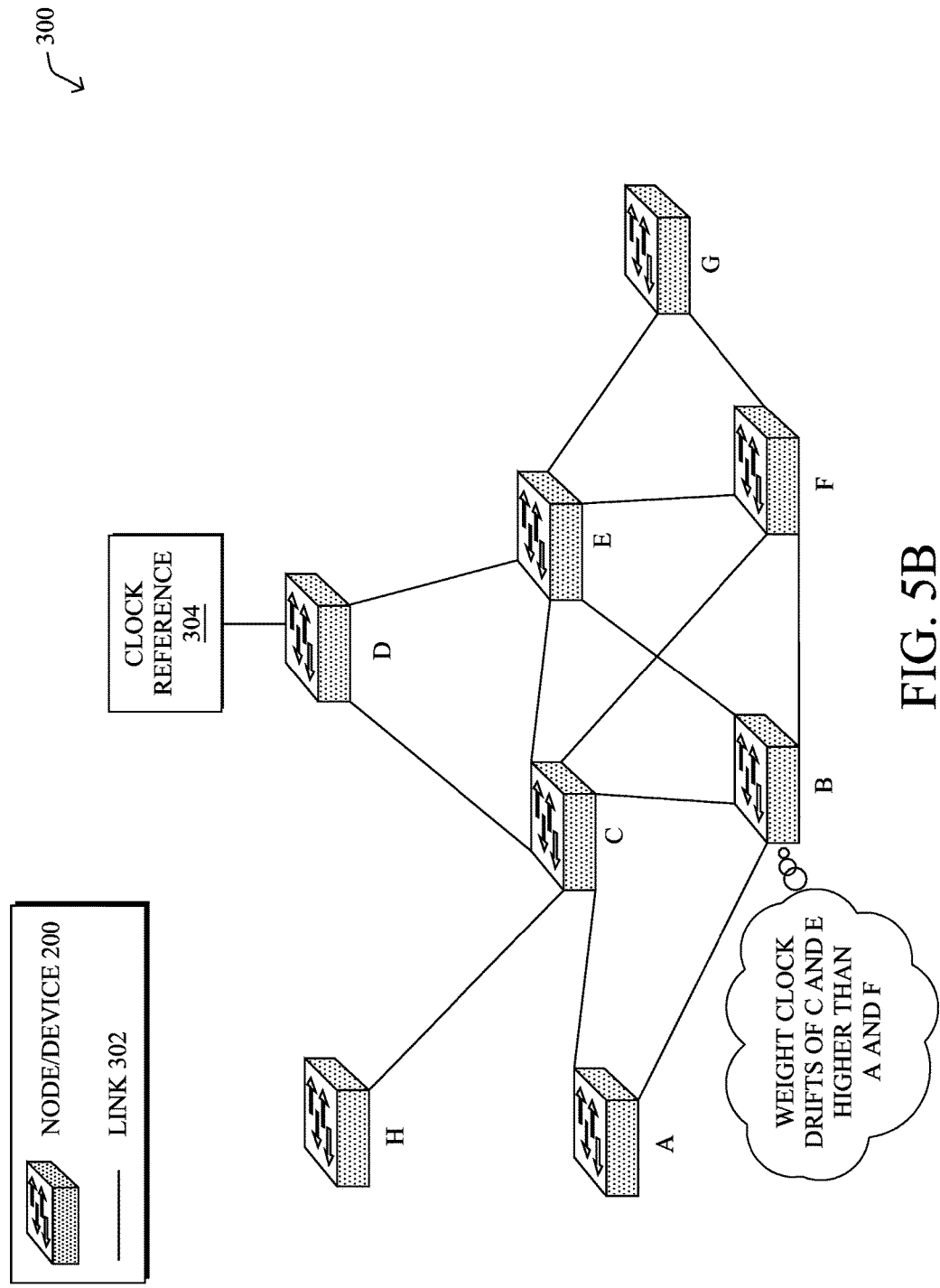
Figure 5C:
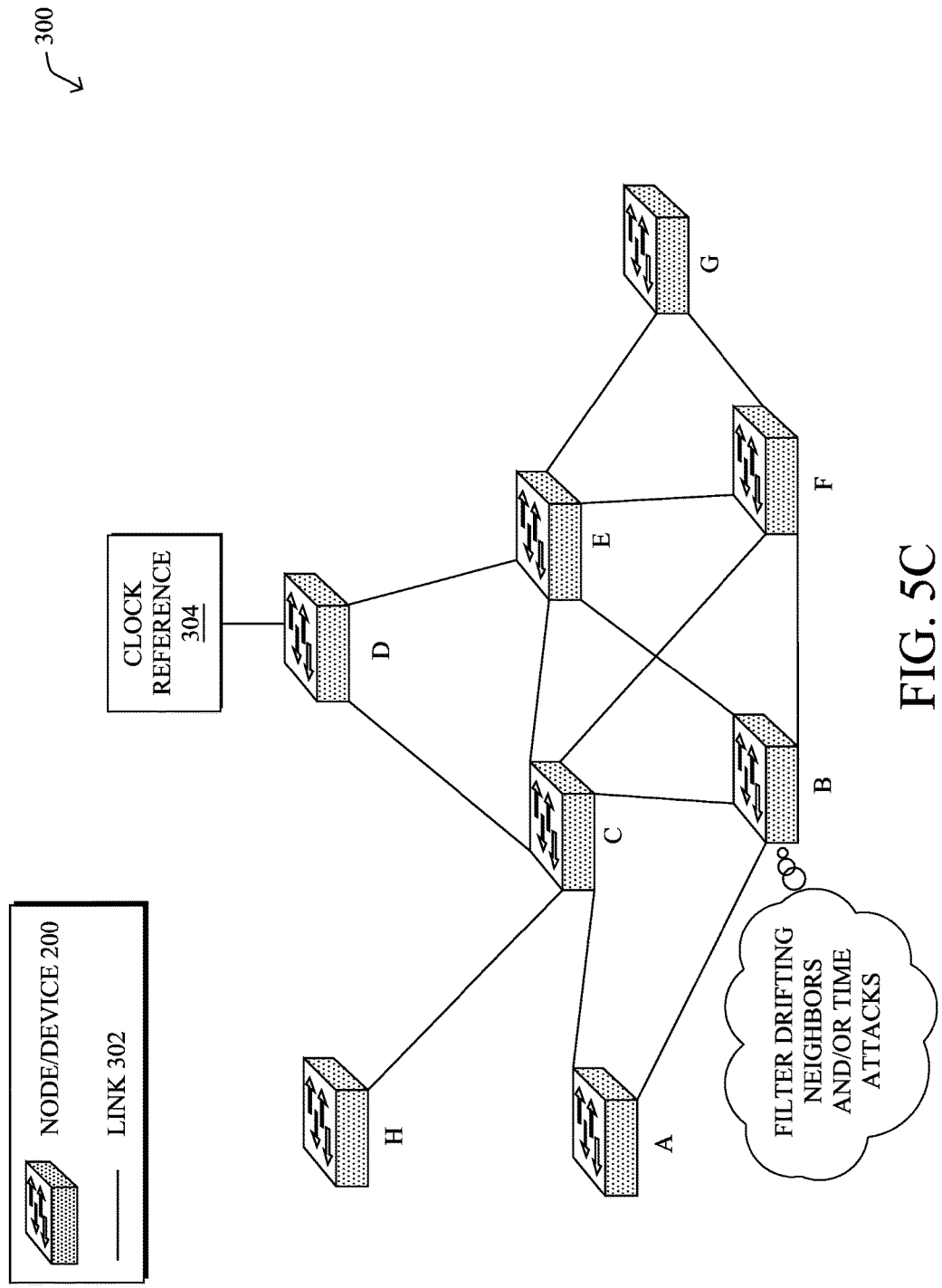

FIGS. 5A-5C illustrate examples of a device in a deterministic network assessing neighbor clock drift, in various embodiments. As shown, consider again deterministic network 300 in which devices A-G are interconnected by links 102. Various modifications can be made to the techniques described with respect to FIGS. 3A-3C, to avoid time loops by leveraging the local routing protocol, filter out consideration of neighbors whose clocks have drifted too far, and/or attempt to harmonize the clocks more in line with the clock reference 304.

In some embodiments, devices A-H may leverage the local routing protocol in use, to avoid time loops. For example, consider again the case of device B calculating a clock adjustment based on the arrival times of the packets that it receives from its neighbors. In one embodiment, device B may select only those neighbors that are closer to clock reference 304 than itself in the network, for purposes of updating its own clock. For example, device B can identify the distances from its neighbors to clock reference 304 using a distance vector protocol, such as RIP, EIGRP, BABEL, or RPL. In the case of a link state protocol (e.g., OSPF, IS-IS, OLSR, etc.), the distance to clock reference 304 can be obtained from Hello protocol advertisements or the like.

More specifically, of the set of neighbors A, C, E, and F of device B, device B may only consider the clock drifts of C and E, since these devices are closer to clock reference 304 than device B. Notably, as shown, devices C and E are each two hops away from clock reference 304, whereas devices A, B, and F are three hops away. In such a case, device B may ignore the amounts of clock drift for devices A and F, when calculating the adjustment for its own internal clock.

Another neighbor selection approach is illustrated in FIG. 5B. In some embodiments, rather than completely excluding the amounts of clock drift for certain neighbors (e.g., those neighbors that are no closer to clock reference 304 than device B), device B may instead apply a weighting to each of their clock drifts based on their distances to clock reference 304. Similar to the case in FIG. 5A, the distances to clock reference 304 may be determined using some form of distance vector protocol (e.g., the routing protocol in use in network 300). In turn, the weighting may be such that clock drifts associated with neighbors that are closer to clock reference 304 are weighted more heavily than those that are farther away. Device B can then use these weighted clock drifts to calculate its own clock adjustment. In some cases, some form of smoothing can be applied throughout network 300 such that devices that are very close to clock reference 304 adjust their clocks with their computed drifts and devices that are farther away can use a decreasing correction (e.g., the computed drift divided by a 2 power distance from the reference).

A further example of neighbor selection is illustrated in FIG. 5C. In some embodiments, a given device may filter out any neighbors whose clock drifts exceed a threshold amount from being used to adjust the clock of the device. Doing so effectively filters out excessively drifting neighbors and/or prevents time attacks that maliciously attempt to disrupt the clock synchronization in the network. For example, device B may not consider the amount of clock drift of device A if it exceeds a predefined threshold, it differs from those of the other neighbors of B by a threshold amount, or the like. In another embodiment, more than one time may be maintained, each with a different reference node placed at various angles of the network, and the final time in used is an average of the other, eliminating any that may be far from the others.

Figure 6:
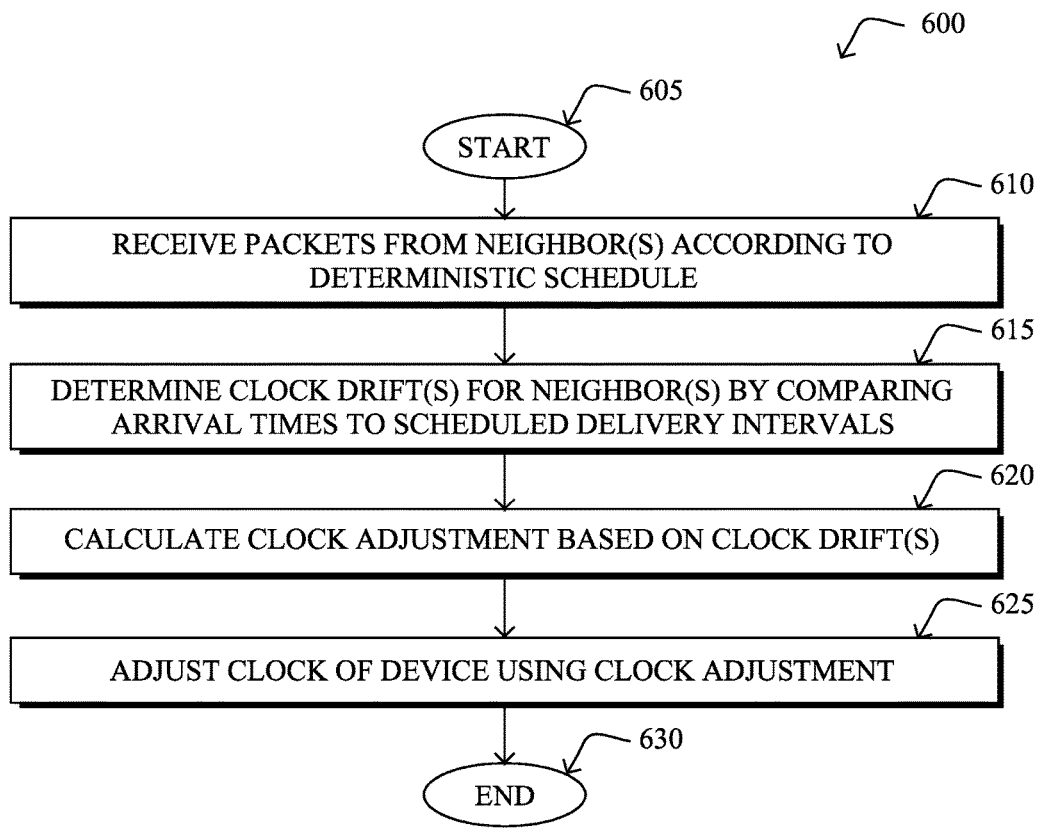
FIG. 6 illustrates an example simplified procedure for clock harmonization in a deterministic network.

FIG. 6 illustrates an example simplified procedure for clock harmonization in a deterministic network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may receive a plurality of packets from one or more neighbors of the device, wherein each of the packets has a scheduled delivery time interval according to a deterministic communication schedule. Such a schedule may be computed and installed to the device by a supervisory device in the network (e.g., an orchestrator or the like) that defines transmit time intervals during which a device may send a packet to a neighbor and delivery time intervals during which the device may expect to receive packets from a neighbor. In various embodiments, the device may be a switch or other networking device in a hardwired network (e.g., Ethernet) or wireless network.

At step 615, as detailed above, the device may determine an amount of clock drift for each of the one or more neighbors of the device by comparing arrival times of the received packets to their scheduled delivery time intervals. For example, the device may determine the amount of clock drift of a particular neighbor by comparing the actual arrival time of a packet from the neighbor to the midpoint of the delivery time interval in the deterministic communication schedule. As would be appreciated, one would expect the arrival to be at the exact midpoint, if the clocks of the device and its neighbor are in perfect synchronization.

At step 620, the device may calculate a clock adjustment based on the amount of clock drift for each of the one or more neighbors, as described in greater detail above. In some embodiments, the device may calculate the adjustment as the average amount of clock drift among its neighbor(s). In further embodiments, the device may calculate the clock adjustment by weighting the amounts of clock drift of its neighbors based on the distances between the neighbors and a clock reference in the network (e.g., as determined by a routing protocol in use in the network). The clock reference may generally synchronize the clocks of the devices in the network via messaging from a time synchronization protocol, such as PTP or NTP.

At step 625, as detailed above, the device may adjust the clock of the device using the clock adjustment calculated in step 620. In various embodiments, the adjustment may be made subsequent to the device synchronizing its clock via PTP or NTP messaging from the clock reference in the network. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, that help to harmonize the clocks of devices in a deterministic network. In particular, the techniques herein help to address the possibility of clock drift, even when a synchronization protocol such as NTP or PTP is used. By basing the clock adjustments of a device on the clock drift of its neighbor(s), the devices can still remain harmonized in accordance with the deterministic communication schedule, even if all of the devices drift away from the reference clock in the network. In further aspects, the techniques herein can also be used to prevent time attacks on the network by filtering out neighbors that drift too far from consideration.

While there have been shown and described illustrative embodiments that provide for clock harmonization in deterministic networks, it is to be understood that various other adaptations and modifications may be made within the spirit and scope of the embodiments herein. For example, while certain protocols are shown, such as NTP and PTP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, a plurality of packets from one or more neighbors of the device, wherein each of the packets has a scheduled delivery time interval according to a deterministic communication schedule;
determining, by the device, an amount of clock drift for each of the one or more neighbors of the device by comparing arrival times of the received packets to their scheduled delivery time intervals according to the deterministic communication schedule;
determining, by the device, a distance from each of the one or more neighbors of the device to a clock reference in the network;
calculating, by the device, a clock adjustment based on the amount of clock drift for each of the one or more neighbors by applying, for each of the one or more neighbors, a weighting to the amount of clock drift for that neighbor, based on the determined distance from that neighbor to the clock reference in the network; and
adjusting, by the device, a clock of the device using the calculated clock adjustment.

2. The method as in claim 1, further comprising:
using, by the device, the adjusted clock to send a packet from the device to a neighbor of the device at a scheduled time according to the deterministic communication schedule.

3. The method as in claim 1, further comprising:
setting, by the device, the clock of the device based on a Network Time Protocol (NTP) or Precision Time Protocol (PTP) message received by the device, wherein the device adjusts the clock based on the average amount of clock drift for the one or more neighbors after setting the clock based on the NTP or PTP message.

4. The method as in claim 1, further comprising:
selecting, by the device, the one or more neighbors from among a set of neighbors of the device from which the device received packets, based on the selected one or more neighbors of the device being closer in the network to a clock reference than that of the device.

5. The method as in claim 1, wherein calculating the clock adjustment based on the amount of clock drift for each of the one or more neighbors comprises:
calculating the clock adjustment as an average clock drift for the one or more neighbors.

6. The method as in claim 1, wherein the device determines the distance from each of the one or more neighbors of the device to the clock reference based on routing protocol messaging in the network.

7. The method as in claim 1, further comprising:
filtering, by the device, the amount of clock drift of a particular neighbor of the node from being used to calculate the clock adjustment, when the amount of clock drift of the particular neighbor differs from that of other neighbors of the device by a threshold amount.

8. The method as in claim 1, wherein the device comprises an Ethernet switch.

9. An apparatus, comprising:
one or more network interfaces to communicate with a network;
a processor coupled to the network interfaces and adapted to execute one or more processes; and
a memory configured to store a process executable by the processor, the process when executed configured to:
receive a plurality of packets from one or more neighbors of the apparatus, wherein each of the packets has a scheduled delivery time interval according to a deterministic communication schedule;
determine an amount of clock drift for each of the one or more neighbors of the apparatus by comparing arrival times of the received packets to their scheduled delivery time intervals according to the deterministic communication schedule;
determine a distance from each of the one or more neighbors of the device to a clock reference in the network;
calculate a clock adjustment based on the amount of clock drift for each of the one or more neighbors by applying, for each of the one or more neighbors, a weighting to the amount of clock drift for that neighbor, based on the determined distance from that neighbor to the clock reference in the network; and
adjust a clock of the apparatus using the calculated clock adjustment.

10. The apparatus as in claim 9, wherein the process when executed is further configured to:
use the adjusted clock to send a packet from the apparatus to a neighbor of the apparatus at a scheduled time according to the deterministic communication schedule.

11. The apparatus as in claim 9, wherein the process when executed is further configured to:
set the clock of the apparatus based on a Network Time Protocol (NTP) or Precision Time Protocol (PTP) message received by the apparatus, wherein the apparatus adjusts the clock based on the average amount of clock drift for the one or more neighbors after setting the clock based on the NTP or PTP message.

12. The apparatus as in claim 9, wherein the process when executed is further configured to:
select the one or more neighbors from among a set of neighbors of the apparatus from which the apparatus received packets, based on the selected one or more neighbors of the apparatus being closer in the network to a clock reference than that of the apparatus.

13. The apparatus as in claim 9, wherein the apparatus calculates the clock adjustment based on the amount of clock drift for each of the one or more neighbors by:
calculating the clock adjustment as an average clock drift for the one or more neighbors.

14. The apparatus as in claim 9, wherein the apparatus determines the distance from each of the one or more neighbors of the apparatus to the clock reference based on routing protocol messaging in the network.

15. The apparatus as in claim 9, wherein the process when executed is further configured to:
filter the amount of clock drift of a particular neighbor of the node from being used to calculate the clock adjustment, when the amount of clock drift of the particular neighbor differs from that of other neighbors of the apparatus by a threshold amount.

16. The apparatus as in claim 9, wherein the apparatus comprises an Ethernet switch.

17. A tangible, non-transitory, computer-readable medium storing program instructions that cause a device in a network to execute a process comprising:
receiving, at the device, a plurality of packets from one or more neighbors of the device, wherein each of the packets has a scheduled delivery time interval according to a deterministic communication schedule;

determining, by the device, an amount of clock drift for each of the one or more neighbors of the device by comparing arrival times of the received packets to their scheduled delivery time intervals according to the deterministic communication schedule;

determine a distance from each of the one or more neighbors of the device to a clock reference in the network;

calculating, by the device, a clock adjustment based on the amount of clock drift for each of the one or more neighbors by applying, for each of the one or more neighbors, a weighting to the amount of clock drift for that neighbor, based on the determined distance from that neighbor to the clock reference in the network; and adjusting, by the device, a clock of the device using the calculated clock adjustment.

18. The computer-readable medium as in claim 17, wherein the process further comprises:

using, by the device, the adjusted clock to send a packet from the device to a neighbor of the device at a scheduled time according to the deterministic communication schedule.

19. The computer-readable medium as in claim 17, wherein the process further determines the distance from each of the one or more neighbors of the apparatus to the clock reference based on routing protocol messaging in the network.

20. The computer-readable medium as in claim 17, wherein the process further comprises:

selecting, by the device, the one or more neighbors from among a set of neighbors of the apparatus from which the apparatus received packets, based on the selected one or more neighbors of the apparatus being closer in the network to a clock reference than that of the apparatus.

* * * * *